United States Patent
Shao et al.

(10) Patent No.: US 12,299,696 B2
(45) Date of Patent: May 13, 2025

(54) METHODS AND SYSTEMS FOR PROCESSING SMART GAS REGULATORY INFORMATION BASED ON REGULATORY INTERNET OF THINGS

(71) Applicant: CHENGDU QINCHUAN IOT TECHNOLOGY CO., LTD., Sichuan (CN)

(72) Inventors: Zehua Shao, Chengdu (CN); Junyan Zhou, Chengdu (CN); Lei He, Chengdu (CN); Siwei Zeng, Chengdu (CN); Xiaojun Wei, Chengdu (CN)

(73) Assignee: CHENGDU QINCHUAN IOT TECHNOLOGY CO., LTD., Chengdu (CN)

( * ) Notice: Subject to any disclaimer, the term of this patent is extended or adjusted under 35 U.S.C. 154(b) by 0 days.

(21) Appl. No.: 18/619,142

(22) Filed: Mar. 27, 2024

(65) Prior Publication Data

US 2024/0242232 A1 Jul. 18, 2024

(30) Foreign Application Priority Data

Mar. 5, 2024 (CN) .......................... 202410249944.6

(51) Int. Cl.
*G06Q 30/018* (2023.01)
*G06Q 50/06* (2024.01)
*G06Q 50/26* (2024.01)

(52) U.S. Cl.
CPC .......... *G06Q 30/018* (2013.01); *G06Q 50/06* (2013.01); *G06Q 50/265* (2013.01)

(58) Field of Classification Search
None
See application file for complete search history.

(56) References Cited

U.S. PATENT DOCUMENTS

2007/0265882 A1    11/2007  Jennings et al.
2013/0238158 A1     9/2013  Gan et al.
(Continued)

FOREIGN PATENT DOCUMENTS

CN    106254502 A    12/2016
CN    112561726 A     3/2021
(Continued)

OTHER PUBLICATIONS

T. R. Wanasinghe, R. G. Gosine, L. A. James, G. K. I. Mann, O. de Silva and P. J. Warrian, "The Internet of Things in the Oil and Gas Industry: A Systematic Review," in IEEE Internet of Things Journal, vol. 7, No. 9, pp. 8654-8673, Sep. 2020. (Year: 2020).*
(Continued)

*Primary Examiner* — Andrew B Whitaker
(74) *Attorney, Agent, or Firm* — METIS IP LLC

(57) ABSTRACT

Disclosed is a method and a system for processing smart gas regulatory information based on a regulatory Internet of Things (IoT). The method may be executed by a gas company management platform of the system for processing the smart gas regulatory information and may include: obtaining gas regulatory information of a plurality of gas regulatory regions; determining target gas regulatory information from the gas regulatory information based on a target regulatory characteristic; updating data accountability levels of different gas regulatory regions based on the target gas regulatory information; determining redundant data and contradictory data based on the target gas regulatory information and the data accountability levels; obtaining processed target gas regulatory information based on the redundant data and the contradictory data; and adjusting communication priorities of a plurality of sets of communication sub-devices based on the data accountability levels.

12 Claims, 5 Drawing Sheets

(56) References Cited

U.S. PATENT DOCUMENTS

| | | | |
|---|---|---|---|
| 2016/0010445 A1* | 1/2016 | Harrison | E21B 47/00 |
| | | | 702/6 |
| 2017/0220964 A1* | 8/2017 | Datta Ray | H04L 63/1433 |
| 2018/0284758 A1* | 10/2018 | Cella | H04L 1/18 |
| 2018/0332370 A1 | 11/2018 | Shao | |
| 2019/0372345 A1* | 12/2019 | Bain | H02J 3/381 |
| 2020/0162354 A1* | 5/2020 | Drees | G06N 5/04 |
| 2022/0172221 A1* | 6/2022 | Bhattiprolu | H04L 9/50 |
| 2023/0075722 A1 | 3/2023 | Shao et al. | |
| 2023/0095727 A1 | 3/2023 | Shao et al. | |
| 2024/0012393 A1* | 1/2024 | Moradian | C23C 14/54 |

FOREIGN PATENT DOCUMENTS

| | | |
|---|---|---|
| CN | 115456315 A | 12/2022 |
| CN | 115879324 A | 3/2023 |
| CN | 116415916 A | 7/2023 |
| CN | 117610214 A | 2/2024 |

OTHER PUBLICATIONS

Wanasinghe et al. (Year: 2020).*
Zhao, Zinan, Research on the Regulatory System of Gas Industry in the Public Utilities, Database Economics and Management Science Series, 9, 2014, 46 pages.
Ji, Yongchao, Design of Industrial Intelligent Gas Control System Based on Internet of Things, Database Engineering Technology II, 2, 2020, 67 pages.
Avita Katal et al., IoT based Safety System: LPG/CNG Detection and Alert, 2021 International Conference on Intelligent Technologies (CONIT), 2021, 6 pages.
Notification to Grant Patent Right for Invention in Chinese Application No. 202410249944.6 mailed on Apr. 9, 2024, 6 pages.

* cited by examiner

METHODS AND SYSTEMS FOR PROCESSING SMART GAS REGULATORY INFORMATION BASED ON REGULATORY INTERNET OF THINGS

CROSS-REFERENCE TO RELATED APPLICATIONS

This application claims priority to Chinese Patent Application No. 202410249944.6, filed on Mar. 5, 2024, the entire contents of which are hereby incorporated by reference.

TECHNICAL FIELD

The present disclosure relates to the field of gas regulation information processing, and in particular to a method and a system for processing smart gas regulatory information based on a regulatory Internet of Things (IoT).

BACKGROUND

Gas companies submit a large amount of gas regulation information to government management platforms. There may be a significant amount of redundant, contradictory, and problem data in the gas regulation information from different gas regions, which may result in inefficient data processing and a decline in data quality, thereby affecting the evaluation of the gas companies by relevant government platforms. Gas companies need to process the gas regulation information reported to the government management platforms to ensure the data quality.

Therefore, it is desirable to provide a method and a system for processing smart gas regulatory information based on regulatory Internet of Things (IoT), which can identify and process the redundant, contradictory, and problem data in the large amount of gas regulation information reported and summarized from different regions, thereby improving data processing efficiency and enhancing data regulation quality.

SUMMARY

One or more embodiments of the present disclosure provide a method for processing smart gas regulatory information based on a regulatory Internet of Things (IoT). The method may be executed by a gas company management platform of a system for processing the smart gas regulatory information, and the method may include: obtaining gas regulatory information of a plurality of gas regulatory regions based on a gas company sensing network platform of the system for processing the smart gas regulatory information, wherein the gas company sensing network platform includes a plurality of sets of communication sub-devices configured in different gas regulatory regions of the plurality of gas regulatory regions, and communication priorities of the plurality of sets of communication sub-devices in the different gas regulatory regions are different; determining target gas regulatory information from the gas regulatory information based on a target regulatory characteristic; updating data accountability levels of the different gas regulatory regions based on the target gas regulatory information; determining redundant data and contradictory data based on the target gas regulatory information and the data accountability levels; obtaining processed target gas regulatory information based on the redundant data and the contradictory data, and transmitting the processed target gas regulatory information to a government regulatory management platform of the system for processing the smart gas regulatory information via a government regulatory sensing network platform of the system for processing the smart gas regulatory information, so as to enable the government regulatory management platform to establish a gas regulatory database based on the processed target gas regulatory information and further provide a gas regulatory query service to a user through a public user platform of the system for processing the smart gas regulatory information; and adjusting the communication priorities of the plurality of sets of communication sub-devices based on the data accountability levels.

One or more embodiments of the present disclosure provide a system for processing smart gas regulatory information based on a regulatory Internet of Things (IoT). The system may include a public user platform, a government regulatory service platform, a government regulatory management platform, a government regulatory sensing network platform, a government regulatory object platform, a gas company sensing network platform, a gas user object platform, and a gas device object platform. The government regulatory service platform may include a citizen cloud service sub-platform and a government safety management service sub-platform. The government regulatory management platform may include a government gas business management sub-platform and a government safety management sub-platform. The government regulatory sensing network platform may include a government gas regulatory authority sensing network sub-platform and a government safety management department sensing network sub-platform. The government regulatory object platform may include a gas company management platform, which may be configured to: obtain gas regulatory information of a plurality of gas regulatory regions based on a gas company sensing network platform of the system for processing the smart gas regulatory information, wherein the gas company sensing network platform includes a plurality of sets of communication sub-devices configured in different gas regulatory regions of the plurality of gas regulatory regions, and communication priorities of the plurality of sets of communication sub-devices in the different gas regulatory regions are different; determine target gas regulatory information from the gas regulatory information based on a target regulatory characteristic; update data accountability levels of the different gas regulatory regions based on the target gas regulatory information; determine redundant data and contradictory data based on the target gas regulatory information and the data accountability levels; obtain processed target gas regulatory information based on the redundant data and the contradictory data, and transmit the processed target gas regulatory information to the government regulatory management platform via the government regulatory sensing network platform; and adjust the communication priorities of the plurality of sets of communication sub-devices based on the data accountability levels.

The beneficial effects of one or more embodiments of the present disclosure may include, but are not limited to: (1) The coordinated operation of various functional platforms of the system for processing smart gas regulatory information based on regulatory IoT ensures the informatization and intelligence of gas information regulation. (2) By processing gas regulation information from different gas regulation regions, it is possible to prioritize data transmission according to the importance of gas regulation regions, thereby improving the efficiency of data transmission. Additionally, a gas regulation query service can be provided to a user, allowing the gas user to query gas-related data more quickly and accurately. (3) By determining necessary regulatory information and additional regulatory information, it is possible to ensure that the gas regulation information submitted by different gas regulation regions meets the requirements of government platforms, reducing platform operating costs. Moreover, different amounts of submissions of gas regulatory information can be matched according to different gas regulation regions and periods, so that the target gas regulation information is determined more in line with actual conditions. (4) By establishing a regulatory graph based on data from different gas regulation regions, a correlation between gas data in different gas regulation regions can be presented clearly. By processing the regulatory graph through a well-trained regulatory model, it is possible to reasonably assign accountability levels and eliminate the redundant data and contradictory data in the gas regulation information submitted by different gas regulation regions, ensuring data quality.

BRIEF DESCRIPTION OF THE DRAWINGS

The present disclosure will be further illustrated by way of exemplary embodiments, which will be described in detail with reference to the accompanying drawings. These embodiments are not limiting. In these embodiments, the same numbering indicates the same structure, wherein.

DETAILED DESCRIPTION

Figure 1:
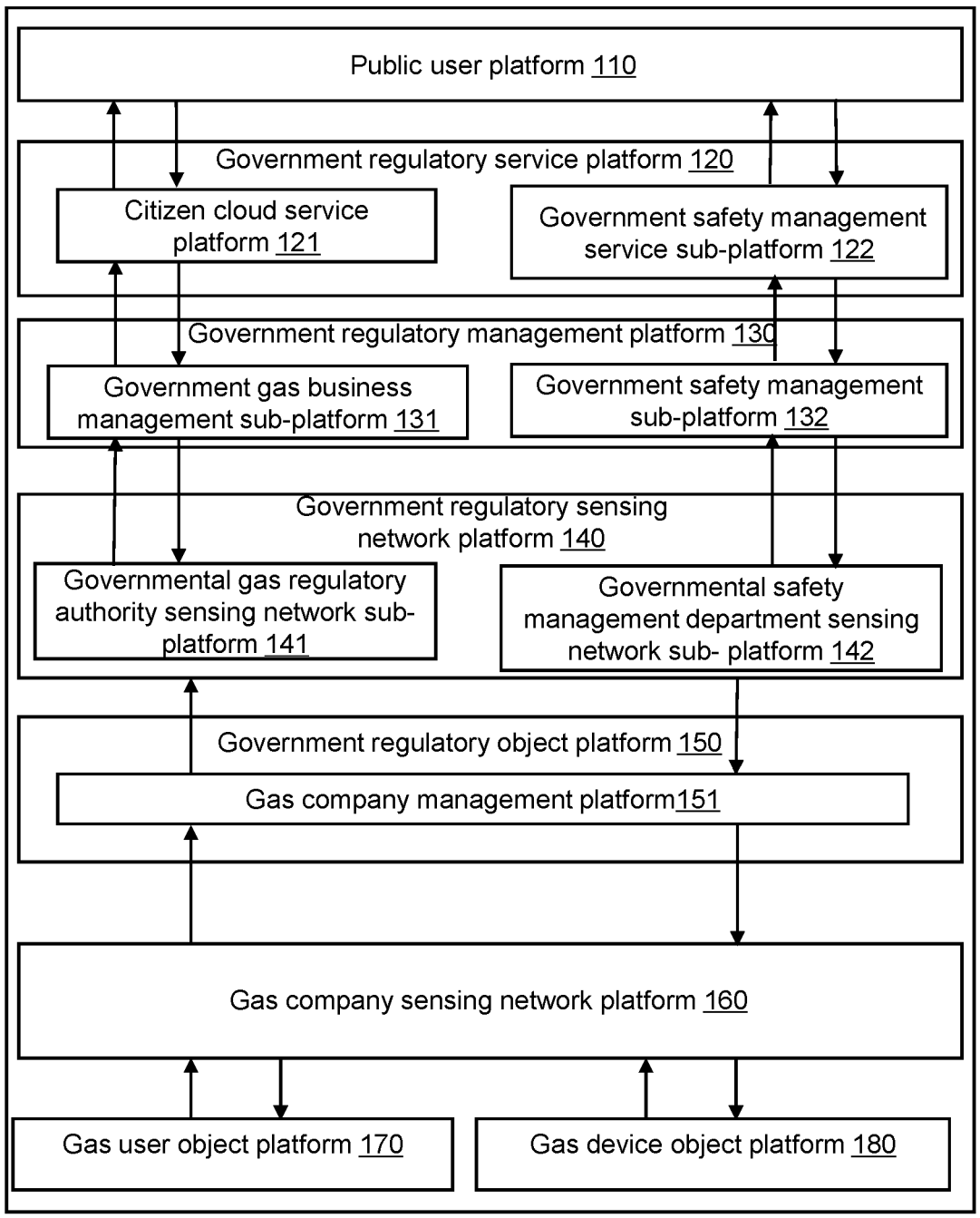
FIG. 1 is a schematic structural diagram of a system for processing smart gas regulatory information based on a regulatory Internet of Things (IoT) according to some embodiments of the present disclosure.

In order to further illustrate the technical solutions of the embodiments of the present disclosure, a brief introduction will be made to the drawings required for the description of the embodiments. It is obvious that the drawings described below are only examples or embodiments of the present disclosure. For those skilled in the art, without exercising inventive labor, the present disclosure may also be applied to other similar scenarios based on these drawings. Unless otherwise indicated or specified from the context, identical reference numerals in the drawings represent identical structures or operations.

FIG. 1 is a schematic structural diagram of a system for processing smart gas regulatory information based on a regulatory Internet of Things (IoT) according to some embodiments of the present disclosure.

In some embodiments, as shown in FIG. 1, a system 100 for processing smart gas regulatory information may include a public user platform 110, a government regulatory service platform 120, a government regulatory management platform 130, a government regulatory sensing network platform 140, a government regulatory object platform 150, a gas company sensing network platform 160, a gas user object platform 170, and a gas device object platform 180.

The public user platform 110 refers to a platform for interacting with a user. In some embodiments, the public user platform 110 may be configured as a terminal device.

In some embodiments, the public user platform 110 may interact with the government regulatory service platform 120 for information exchange. For example, the user may query and receive information about a gas regulatory service via the public user platform 110.

The government regulatory service platform 120 is a platform that provides the gas regulatory service to the user. The government regulatory service platform 120 includes a citizen cloud service platform 121 and a government safety management service sub-platform 122.

The government regulatory management platform 130 refers to a comprehensive management platform for government management information. The government regulatory management platform 130 includes a government gas business management sub-platform 131 and a government safety management sub-platform 132. In some embodiments, the government gas business management sub-platform 131 may receive information (e.g., gas consumption data, gas reserve data, gas engineering construction data) related to a gas business to regulate and manage the gas business. The government safety management sub-platform 132 may receive information (e.g., gas safety event alarm data, gas device operation status data, gas pipeline network maintenance data) related to gas safety to regulate and manage gas safety.

In some embodiments, the government regulatory management platform 130 may interact with the government regulatory sensing network platform 140. For example, the government regulatory management platform 130 may receive processed target gas regulatory information via the government regulatory sensing network platform 140, and establish a gas regulatory database for querying based on the processed target gas regulatory information.

The government regulatory sensing network platform 140 is a platform for integrated management of government sensing information, such as a communication base station, a router, a wireless WIFI device, etc. In some embodiments, the government regulatory sensing network platform 140 may include a government gas regulatory authority sensing network sub-platform 141 and a government safety management department sensing network sub-platform 142. In some embodiments, the government regulatory sensing network platform 140 may interact with the government regulatory management platform 130 and the government regulatory object platform 150.

The government regulatory object platform 150 is a platform for generating government regulatory information and controlling information execution.

In some embodiments, the government regulatory object platform 150 may include a gas company management platform 151. In some embodiments, the gas company management platform 151 may interact with the gas company sensing network platform 160. For example, the gas company management platform 151 may obtain gas regulatory information of different gas regulatory regions based on the gas company sensing network platform 160. In some embodiments, the gas company management platform 151 may be configured on a gas company management server.

In some embodiments, the gas company management platform 151 may be configured to obtain gas regulatory information of a plurality of gas regulatory regions based on the gas company sensing network platform 160, the gas regulatory information being obtained and stored based on the gas device object platforms 180 and the gas user object platforms 170 of the plurality of gas regulatory regions. The gas company management platform 151 may be further configured to determine a target regulatory characteristic via the government regulatory management platform 130, determine target gas regulatory information from the gas regulatory information based on the target regulatory characteristic, and update data accountability levels of different gas regulatory regions based on the target gas regulatory information. The gas company management platform 151 may be further configured to determine redundant data and contradictory data based on the target gas regulatory information and the data accountability levels, process the redundant data and the contradictory data to obtain processed target gas regulatory information, and transmit the processed target gas regulatory information through the government regulatory sensing network platform 140 to the government regulatory management platform 130, allowing the government regulatory management platform 130 to establish a gas regulatory database based on the processed target gas regulatory information and further providing a gas regulatory query service to users through the public user platform 110. The gas company management platform 151 may be further configured to adjust communication priorities of a plurality of sets of communication sub-devices in the gas company sensing network platform 160 based on the data accountability levels.

The gas company sensing network platform 160 refers to a platform for integrated management of sensing information of a gas company. In some embodiments, the gas company sensing network platform 160 includes a communication base station, a router, a WiFi device, etc. In some embodiments, the gas company sensing network platform 160 may interact with the gas company management platform 151, the gas device object platform 180, and the gas user object platform 170.

In some embodiments, the gas company sensing network platform 160 includes a plurality of sets of communication sub-devices. The gas company sensing network platform 160 may include different sensing network sub-platforms, with the different sensing network sub-platforms corresponding to different types of communication sub-devices located in different gas regulatory regions respectively, and the communication priorities of the communication sub-devices in the different gas regulatory regions may be different. In some embodiments, the gas company sensing network platform 160 may obtain the gas regulatory information based on the gas device object platform 180 and the gas user object platform 170.

The gas user object platform 170 is a platform that collects gas user information. For example, the gas user object platform 170 may obtain a gas usage characteristic, a gas usage environment, gas usage safety knowledge, etc., of a gas user. In some embodiments, the gas user object platform 170 may be configured in a terminal of gas operation and maintenance personnel and/or the gas user.

In some embodiments, the gas user object platform 170 may interact with the gas company management platform 151 via the gas company sensing network platform 160.

The gas device object platform 180 is a functional platform for generating perception information and executing control information of a gas device. In some embodiments, the gas device object platform 180 may be configured in a gas end-user household, a gas gate station, a gas field station, a gas regulator station, a valve well, a gas filling station, a gas pipeline ancillary facility, etc.

In some embodiments, the gas device object platform 180 may interact with the gas company management platform 151 via the gas company sensing network platform 160.

More descriptions regarding the functions of the system 100 for processing the smart gas regulatory information may be found in FIGS. 2-5 and the related descriptions thereof.

In some embodiments of the present disclosure, based on the system 100 for processing the smart gas regulatory information, the various functional platforms operate in a coordinated and regulated manner with each other, forming a closed loop of information operation, thus realizing information-based and intelligent smart gas information regulation.

Figure 2:
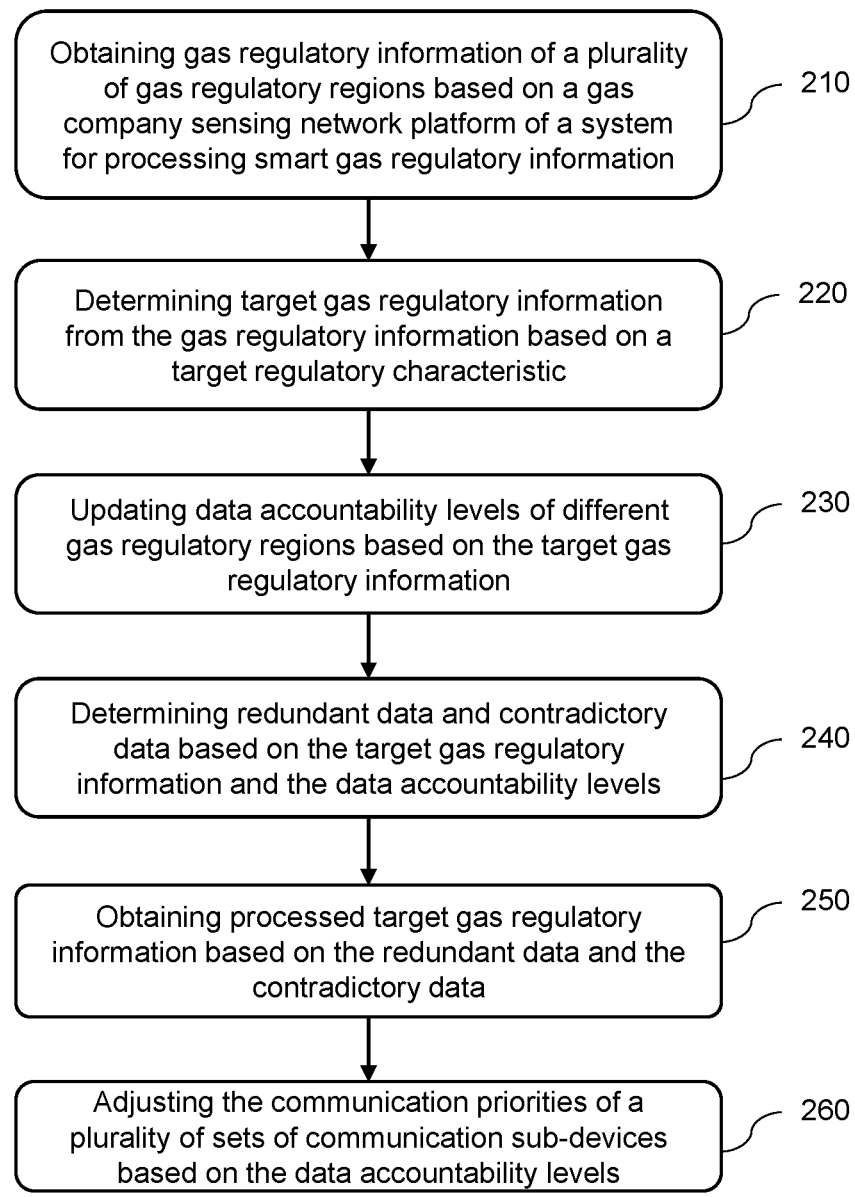
FIG. 2 is a flowchart of an exemplary process of a method for processing smart gas regulatory information according to some embodiments of the present disclosure.

FIG. 2 is a flowchart of an exemplary process of a method for processing smart gas regulatory information according to some embodiments of the present disclosure. As shown in FIG. 2, a process 200 includes the following operations. In some embodiments, the process 200 may be performed by the gas company management platform 151 of the system 100 for processing the smart gas regulatory information.

Operation 210, obtaining gas regulatory information of a plurality of gas regulatory regions based on the gas company sensing network platform 160 of the system 100 for processing the smart gas regulatory information.

A gas regulatory region refers to a pre-defined gas region that is designated for gas regulation and does not overlap with other gas regions. For example, the gas regulatory region may be an administrative area, a street, a neighborhood, or the like.

The gas regulatory information refers to relevant information used for gas regulation. In some embodiments, the gas regulatory information may include gas business data and gas safety data. Examples of the gas business data may include gas usage data, gas reserve data, gas engineering construction data, or the like. Examples of the gas safety data may include gas safety event alarm data, gas device operation status data, gas pipeline network maintenance data, or the like.

In some embodiments, the gas company management platform 151 may obtain the gas regulatory information of the plurality of gas regulatory regions in a variety of feasible ways. For example, the gas company management platform 151 may obtain, based on the gas device object platform 180 and the gas user object platform 170 of the plurality of gas regulatory regions, the gas regulatory information of the plurality of gas regulatory regions via data monitoring devices and store the gas regulatory information in storage devices in respective regions where the data monitoring devices are located.

A data monitoring device is a monitoring device for collecting the gas regulatory information. For example, the data monitoring device may include a gas safety monitoring device, a gas transmission loss monitoring device, or the like.

Operation 220, determining target gas regulatory information from the gas regulatory information based on a target regulatory characteristic.

The target regulatory characteristic refers to predetermined content and an order of gas regulatory information to be submitted. For example, the target gas regulatory characteristic may be submission of three types of data A, B, and C of the gas regulatory information in the order of ABC. In some embodiments, the target regulatory characteristic may be determined by the government regulatory management platform 130 through a lookup table, and the government regulatory management platform 130 may generate a corresponding submission list through the lookup table and send the submission list to the gas company management platform 151.

The target gas regulatory information refers to gas regulatory information corresponding to the target regulatory characteristic.

In some embodiments, the gas company management platform 151 may determine the gas regulatory information corresponding to the target regulatory characteristic from the gas regulatory information based on the preset target regulatory characteristic. In some embodiments, if the government regulatory management platform 130 requires submission of data X, Y, and Z for a specified gas regulatory region in the order of X, Y, and Z, then the gas company management platform 151 submits the data in the order of X, Y, and Z.

Figure 3:
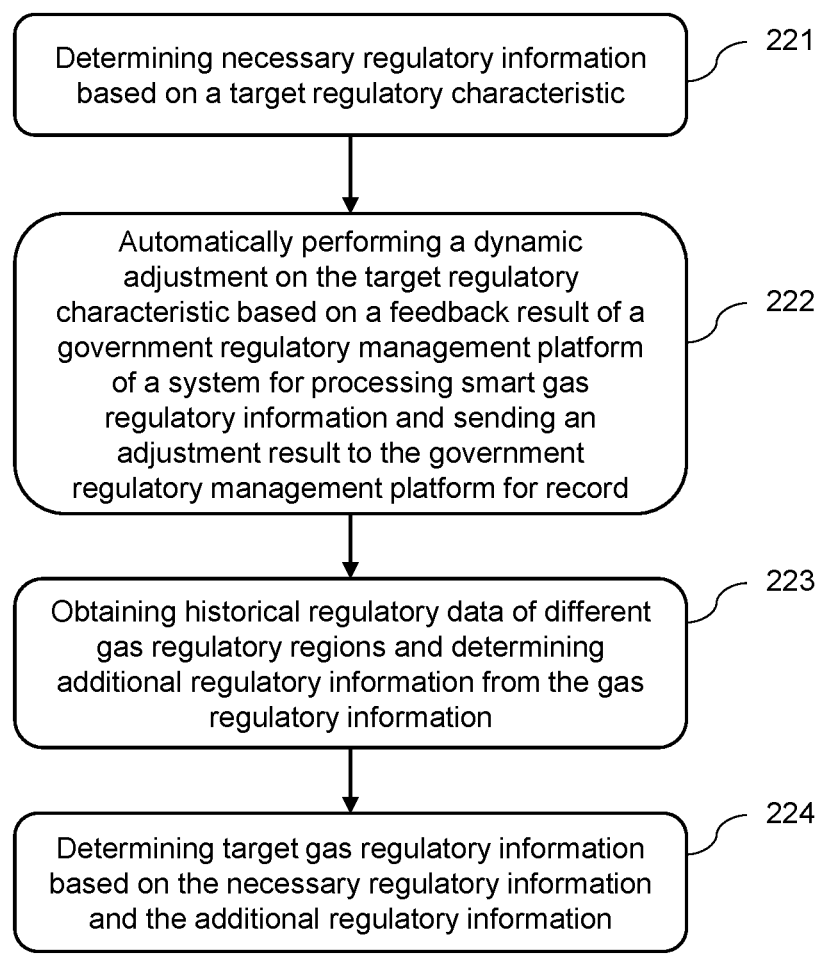
FIG. 3 is a flowchart of an exemplary process of determining target gas regulatory information according to some embodiments of the present disclosure.

More descriptions regarding the determination of the target gas regulatory information may be found in FIG. 3 and the related descriptions thereof.

Operation 230, updating data accountability levels of the different gas regulatory regions based on the target gas regulatory information.

The data accountability levels are used to reflect the division of accountability regarding data quality in different gas regulatory regions. In some embodiments, a higher data accountability level of a gas regulatory region indicates more effective gas regulatory information for the gas regulatory region.

In some embodiments, the gas company management platform 151 may assess data quality of the gas regulatory information for different gas regulatory regions to obtain the data accountability levels. The data quality may be correlated to an amount of redundant data and contradictory data in the gas regulatory information. The smaller the amount of redundant data and contradictory data, the higher the data quality. More descriptions regarding the redundant data and the contradictory data are provide in the below descriptions.

In some embodiments, the assessment of the data accountability levels may be performed manually or by the gas company management platform 151 through a preset rule. For example, the gas company management platform 151 may be configured to divide accountability levels based on the data quality, with each accountability level corresponding to a different data accountability level. The preset rule may be formulated by a technician based on prior knowledge and historical experience.

In some embodiments, the gas company management platform 151 may update the data accountability levels based on the target gas regulatory information in a variety of feasible ways. For example, the data accountability levels may be updated based on importance levels of the different gas regulatory regions and a historical statistic result of the gas regulatory information since a last update of the data accountability levels. The lower the importance level of a gas regulatory region and the larger a count of occurrences of historical problem data, the lower the data accountability level. More descriptions regarding the historical problem data may be found in FIG. 4 and the related descriptions thereof.

In some embodiments, the importance levels of the different gas regulatory region may be manually preset. For example, the importance levels may be determined based on a count of safety incidents of different severity levels occurring in the different gas regulatory regions in a previous year. Merely by way of example, the importance level of a gas regulatory region where one particularly significant incident or two significant incidents occurred may be set to the highest.

Figure 5:
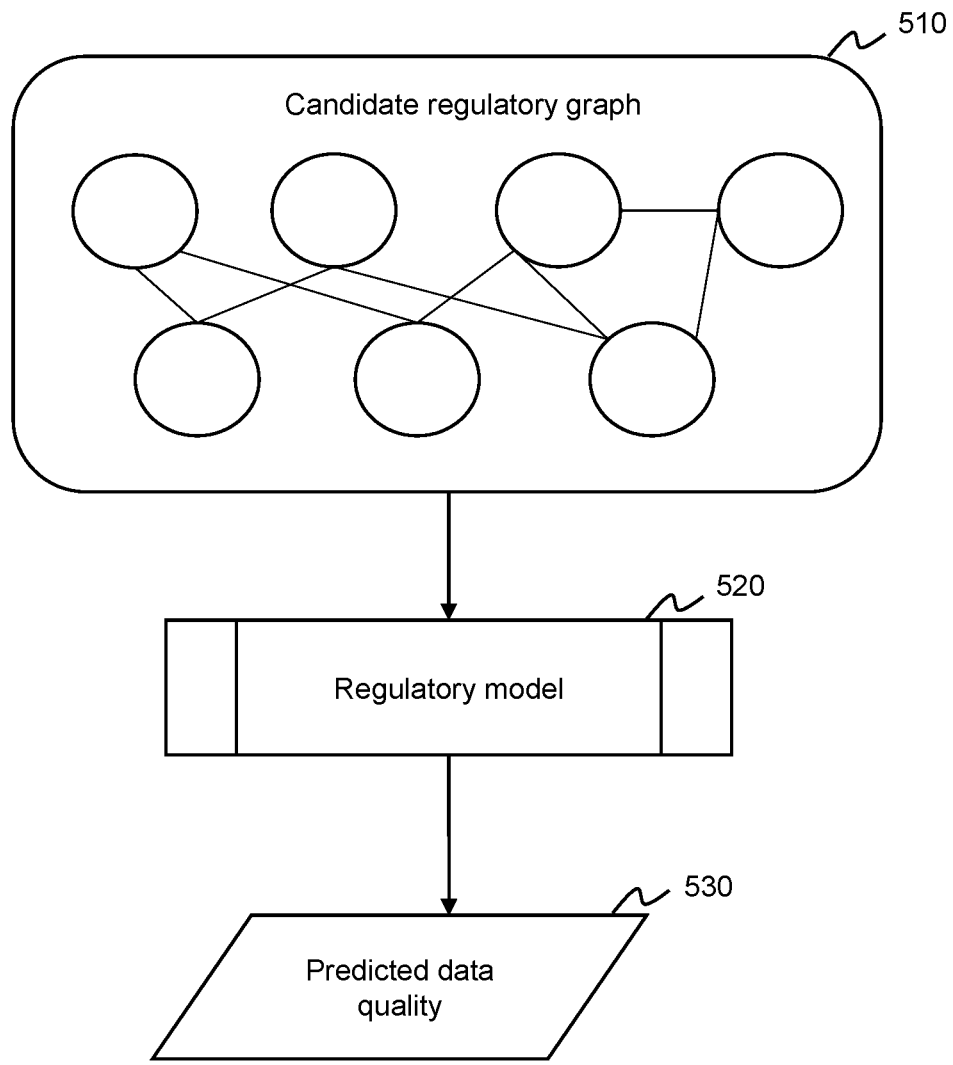
FIG. 5 is a schematic diagram of an exemplary regulatory model according to some embodiments of the present disclosure.

More descriptions regarding the updating of the data accountability levels may be found in FIG. 5 and the related descriptions thereof.

Operation 240, determining the redundant date and the contradictory data based on the target gas regulatory information and the data accountability levels.

Redundant data refers to information that is redundant in the target gas regulatory information. For example, if two sets of target gas regulatory information include a field "Corrosion of Pipe A" respectively, and data contents in the two sets of target gas regulatory information corresponding to the field is the same, then the field and the data content corresponding to the field in one of the two sets of target gas regulatory information are redundant data.

Contradictory data refers to inconsistent information in the target gas regulatory information. For example, if two sets of target gas regulatory information include a field "Corrosion of Pipe A" respectively, and data contents in the two sets of target gas regulatory information corresponding to the field is different, then the field and the data content corresponding to the field in one of the two sets of target gas regulatory information are contradictory data.

In some embodiments, the gas company management platform 151 may determine the redundant date and the contradictory data based on a magnitude of the data accountability level. For example, in a batch of target gas regulatory information simultaneously submitted by gas regulatory regions W and R, if a set of duplicate data G exists, and the data accountability level of region W is greater than the data accountability level of region R, then the data G in region R may be determined as redundant data. The contradictory data may be determined in a similar manner to the determination of the redundant data, and is not repeated.

In some embodiments, the gas company management platform 151 may record determination results of the redundant data and the contradictory data, and send the determination results via the gas company sensing network platform 160 to the gas device object platforms 180 and the gas user object platforms 170 of different gas regulatory regions.

Operation 250, obtaining processed target gas regulatory information based on the redundant data and the contradictory data.

In some embodiments, the gas company management platform 151 may remove the redundant data and the contradictory data from the target gas regulatory information in order to obtain the processed target gas regulatory information.

In some embodiments, the gas company management platform 151 may transmit the processed target gas regulatory information to the government regulatory management platform 130 of the system 100 for processing the smart gas regulatory information though the government regulatory sensing network platform 140 of the system 100 for processing the smart gas regulatory information, so that the government regulatory management platform 130 may establish a gas regulatory database based on the processed target gas regulatory information, and further provide a gas regulatory query service for a user through the public user platform 110 of the system 100 for processing the smart gas regulatory information.

The gas regulatory query service refers to a relevant service that allows querying gas regulatory information. For example, the gas regulatory query service may include gas fault query, gas project construction progress query, and gas data query, which may be query services related to gas faults, gas engineering construction progress, and gas data (e.g., monthly cumulative gas usage, etc.), respectively. In some embodiments, the public user platform 110 may conduct queries based on the gas regulatory database to provide the gas regulatory query service.

Operation 260, adjusting communication priorities of a plurality of sets of communication sub-devices based on the data accountability levels.

In some embodiments, the gas company sensing network platform 160 includes the plurality of sets of communication sub-devices configured in different gas regulatory regions, and the communication priorities of the plurality of sets of communication sub-devices in the different gas regulatory regions are different. A communication sub-device is a device for transmitting gas regulatory information collected by the data monitoring device to the gas company management platform 151. In some embodiments, the communication sub-device may include a data switch, a packet concentrator, and a routing device.

A data switch is a communication device for accomplishing data information exchange. The data switch enable communication between any two data terminals within a data communication network to effectively utilize communication devices and telephone resources within the network. A packet concentrator is a device that aggregates user terminals and is interconnected with a higher-level switching center. A routing device is a hardware device that connects two or more networks.

A communication priority refers to a priority level of the communication sub-device for data transmission. The higher the communication priority, the closer to a front a data transmission order, and the more inclined to prioritize transmission or forwarding.

In some embodiments, the communication priority may include a switching forwarding priority of the data switch and a routing forwarding priority of the routing device.

In some embodiments, the gas company management platform 151 may adjust the communication priorities of the plurality of sets of communication sub-devices in a variety of feasible ways based on the data accountability levels. For example, based on a higher data accountability level of a specific gas regulatory region, the gas company management platform 151 may adjust the communication priority of the communication sub-device corresponding to the gas regulatory region higher. That is, the gas company management platform 151 may adjust the switching forwarding priority of the data switch and the routing forwarding priority of the routing device higher. By reasonably dividing the switching forwarding priority of data switches and the routing forwarding priority of routing devices, the operation of communication devices may be made more efficient, allowing the process of gas regulation to be implemented more smoothly.

In some embodiments of the present disclosure, the data accountability levels of different gas regulatory regions are updated based on the target gas regulatory information. The redundant data and the contradictory data are determined based on the target gas regulatory information and the data accountability levels. The target gas regulatory information is processed based on the redundant data and the contradictory data to provide the gas regulatory query service to the user, enabling the gas user to query gas-related data more quickly and accurately. By adjusting the communication priorities of the plurality of sets of communication sub-devices in the gas company sensing network platform based on the data accountability levels, the prioritization of data transmission can be reasonably arranged according to the importance levels of the gas regulatory regions, thereby improving data transmission efficiency.

FIG. 3 is a flowchart of an exemplary process of determining target gas regulatory information according to some embodiments of the present disclosure. As shown in FIG. 3, a process 220 (also referred to be "operation 220") includes the following operations. In some embodiments, the process 220 may be performed by the gas company management platform 151.

Operation 221, determining necessary regulatory information based on a target regulatory characteristic.

More descriptions regarding the target regulatory characteristic may be found in FIG. 2 and the related descriptions thereof.

The necessary regulatory information refers to the gas regulatory information that must be submitted. For example, the necessary regulatory information may include data on severe gas accidents, complaints from important gas customers, or the like.

In some embodiments, the gas company management platform 151 may determine the necessary regulatory information based on the target regulatory characteristic in a variety of feasible ways. For example, the target regulatory characteristic may include a relevant requirement regarding the necessary regulatory information, and the gas company management platform 151 may determine, based on the relevant requirement in the target regulatory characteristic, relevant data required by the requirement as the necessary regulatory information.

Operation 222, automatically performing a dynamic adjustment on the target regulatory characteristic based on a feedback result of the government regulatory management platform 130 of the system 100 for processing the smart gas regulatory information and sending an adjustment result to the government regulatory management platform 130 for record.

The feedback result refers to feedback regarding gas regulatory information. In some embodiments, the government regulatory management platform 130 may provide feedback on the gas regulatory information submitted by different gas company management platforms 151.

In some embodiments, the gas company management platform 151 may automatically make dynamic adjustments to the target regulatory characteristics based on the feedback result. For example, if the government regulatory management platform 130 provides feedback that the content of a set of gas regulatory information is not detailed enough, requires enhanced regulation, etc., the gas company management platform 151 may increase a count of items that need to be submitted in the target regulatory characteristic, and send the adjustment result to the government regulatory management platform 130 for confirmation and filing.

In some embodiments, the dynamic adjustment may further include adjusting the necessary regulatory information based on the feedback result, as well as historical problem data and an average data accountability level of the different gas regulatory regions.

In some embodiments, the gas company management platform 151 may adjust the necessary regulatory information in various ways based on a qualitative result and/or a quantitative result in the feedback result, combined with the historical problem data and the average data accountability level of the different gas regulatory regions.

Merely by way of example, the qualitative result in the feedback result may indicate that some data types require enhanced regulation; the quantitative result may include a request to increase a ratio of data monitoring points (e.g., an increase of 50%), adding three new types of data to be submitted, etc. Consequently, the gas company management platform 151 may adjust the count of gas data items (types) in the necessary regulatory information based on the qualitative result, for example, adding a certain type of gas data to the necessary regulatory information, and adjust the amount of the necessary regulatory information based on the quantitative result, for example, increasing the amount of data sampling or the frequency of submissions.

In some embodiments, the gas company management platform 151 may designate the necessary regulatory information adjusted based on the feedback result as first regulatory information.

In some embodiments, the gas company management platform 151 may construct data feature vectors based on the historical problem data and the average data accountability level of the different gas regulatory regions, cluster the data feature vectors using a clustering algorithm, and obtain a plurality of clustering centers, wherein the clustering algorithm may be K-mean clustering or other algorithms. The gas company management platform 151 may determine distances between a first set of feature vectors and each of the plurality of clustering centers based on the first necessary regulatory information, determine information corresponding to the vector in the first set of feature vectors having the shortest distance to each of the plurality of clustering centers as second necessary regulatory information, and add the second necessary regulatory information to the necessary regulatory information. Information corresponding to the remaining vectors in the first set of feature vectors that are farther away from each of the plurality of clustering centers is removed from the necessary regulatory information to achieve the adjustment of the necessary regulatory information.

More descriptions reading the data accountability levels may be found in FIG. 2 and the related descriptions thereof. The average data accountability level refers to the average of the data accountability levels over a preset historical time period. More descriptions reading the historical problem data may be found in FIG. 4 and the related descriptions thereof.

In some embodiments of the present disclosure, by adjusting the necessary regulatory information based on the feedback result in conjunction with the historical problem data and the average data responsibility of different gas regulatory regions, the necessary regulatory information can be set in a more reasonable manner, thereby making gas regulation more targeted.

Operation 223, obtaining historical regulatory data of the different gas regulatory regions and determining additional regulatory information from the gas regulatory information.

Historical regulatory data is gas regulatory information that has been submitted in the past. In some embodiments, the gas company management platform 151 may obtain the historical regulatory data for the different gas regulatory regions from a storage device.

Additional regulatory information is information beyond the necessary regulatory information that needs to be submitted. In some embodiments, the additional regulatory information of different gas regulatory regions may vary over different time periods.

In some embodiments, the gas company management platform 151 may determine the additional regulatory information from the gas regulatory information. For example, if historical regulatory data includes historically submitted additional regulatory information, the gas company management platform 151 may determine a weighted value for each item (type) of historically submitted information beyond necessary regulatory information based on an interval value of a time interval. If the determined weighted value of the item exceeds a preset weighting threshold, then the item may be added to the additional regulatory information. A weight may be inversely related to a time interval between a time of a historical submission of information beyond the necessary regulatory information and a current time. The preset weighting threshold may be manually set.

Merely by way of example, there is an item M beyond the necessary regulatory information in the historical regulatory data, and the item M has been reported three times in history, with time intervals from the current time being a days, b days, and c days, respectively, then the weighted value Km of the item M may be calculated by the following formula (1):

$$K_M = \exp(-a) + \exp(-b) + \exp(-c) \qquad (1)$$

If the weighted value is greater than the preset weighting threshold (e.g., 1.5), the item M is determined as one type of current additional regulatory information.

Figure 4:
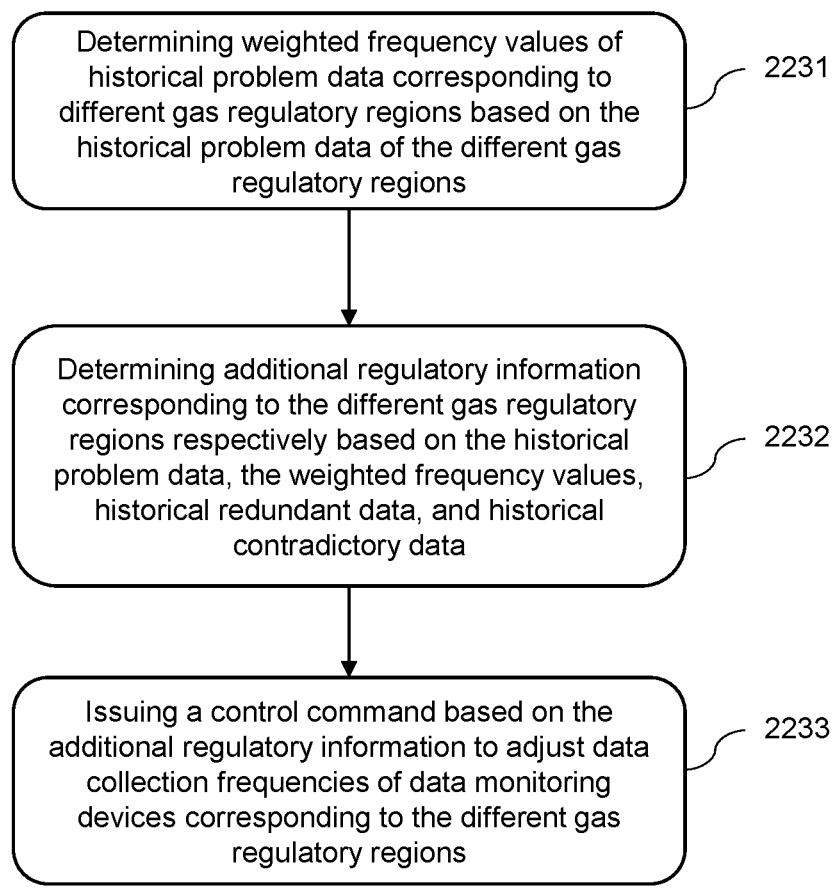
FIG. 4 is a flowchart of an exemplary process of determining additional regulatory information according to some embodiments of the present disclosure.

More descriptions regarding determining the additional regulatory information may be found in FIG. 4 and the related descriptions thereof.

Operation 224, determining the target gas regulatory information based on the necessary regulatory information and the additional regulatory information.

In some embodiments, the gas company management platform 151 may determine the target gas regulatory information in various ways. For example, the gas company management platform 151 may determine the necessary regulatory information and the additional regulatory information collectively as the target gas regulatory information.

In some embodiments of the present disclosure, by determining the necessary regulatory information based on the target regulatory characteristic, dynamically adjusting the target regulatory characteristic based on the feedback result, and filing the adjustment result, the gas regulatory information submitted by different gas regulatory regions can be ensured to meet requirements of government platforms, thereby reducing platform operation costs. Determining the additional regulatory information from the gas regulatory information and determining the target gas regulatory information based on the necessary regulatory information and the additional regulatory information offers greater flexibility, allowing for matching different amounts of gas regulatory information submitted from different gas regulatory regions at different time periods, thus determining the target gas regulatory information that is more in line with actual circumstances.

FIG. 4 is a flowchart of an exemplary process of determining additional regulatory information according to some embodiments of the present disclosure. As shown in FIG. 4, a process 223 (also referred to be "operation 223") includes the following operations. In some embodiments, process 223 may be performed by the gas company management platform 151.

Operation 2231, determining weighted frequency values of historical problem data corresponding to different gas regulatory regions based on the historical problem data of the different gas regulatory regions.

The historical problem data refers to data that reflects problems that occur during gas operations. For example, the historical problem data includes historical gas failure data, historical communication transmission problem data, and historical gas processing problem data.

In some embodiments, the historical problem data may include historical problematic sub-data. The historical problematic sub-data refers to sub-data included in the historical problem data. For example, the historical problematic sub-data may be related to subsets of historical gas failure data, historical communication transmission problem data, and historical gas processing problem data.

A weighted frequency value is a value reflecting a count of occurrences of historical problems. In some embodiments, the higher the count of occurrences of historical problems and the closer a time of occurrence is to the present, the higher the weighted frequency value. The way of determining the weighted frequency value may be referenced from the formula (1) for determining the weighted value in FIG. 3. In some embodiments, the weighted frequency values may be determined based on different historical problematic sub-data, and weights of the different historical problematic sub-data may be different. For example, the gas company management platform 151 may determine the weighted frequency values based on the different historical problematic sub-data and the weights corresponding to the different historical problematic sub-data through weighted summation. The weights are positively correlated with preset importance levels of the different historical problem sub-data for a gas regulatory region. The preset importance level reflects the importance of the historical problematic sub-data and may be manually preset.

Merely by way of example, the weighted frequent value $F_D$ for gas regulatory region D may be determined by the following formula (2):

$$F_D = \sum_{i=1}^{n} f_i * q_i \qquad (2)$$

Wherein, $f_i$ denotes the frequent value of type i in the historical problematic sub-data, which may be determined in the same way for determining the weighted frequent value based on the count of occurrences of historical problems and the time of occurrence as illustrated above, and $q_i$ denotes the weight corresponding to the historical problematic sub-data, which is related to the preset importance level of the historical problematic sub-data, and the weight is a preset value.

In some embodiments of the present disclosure, by assigning different weights to different historical problematic sub-data respectively, the rationality of the final determined weighted frequency values can be ensured, making subsequent determination of the additional regulatory information more reasonable.

Operation 2232, determining the additional regulatory information corresponding to the different gas regulatory regions respectively based on the historical problem data, the weighted frequency values, historical redundant data, and historical contradictory data.

The historical redundant data refers to redundant data in a historical time period.

The historical contradictory data refers to contradictory data in a historical time period.

In some embodiments, the historical redundant data and the historical contradictory data may be obtained from a historical record stored by a storage device.

In some embodiments, the gas company management platform 151 may determine data items (types) included in the additional regulatory information based on the data types of the historical problem data, respectively, adjust an amount of data corresponding to each of the data items based on the weighted frequency values, the historical redundant data, and the historical contradictory data, and thereby determine the additional regulatory information. For example, the amount of data corresponding to each data item may be obtained by subtracting a redundancy and contradiction coefficient from the weighted frequency value corresponding to the data item. The redundancy and contradiction coefficient may be determined based on an amount of the historical redundant data and an amount of the historical contradictory data.

The gas company management platform 151 may categorize the total amount of the historical redundant data and the historical contradictory data into different levels based on the total amount of historical redundant data and the historical contradictory data, with different levels correspond to different redundancy and contradiction coefficients, and the classification manner and the corresponding coefficients may be manually determined.

In some embodiments, the amount of data of the additional regulatory information may be negatively correlated with the amount of data of the historical redundant data and the historical contradictory data.

In some embodiments, a degree of the negative correlation described above may be related to a data accountability level of another gas regulatory region corresponding to the historical redundant data and the historical contradictory data. For example, the greater the data accountability level is, the greater the degree of negative correlation is. Understandably, when the data accountability level of another gas regulatory region corresponding to a gas regulatory region is greater, the data accountability level of the gas regulatory region is generally smaller, indicating a tendency not to submit important additional regulatory information.

Merely by way of example, a gas regulatory region may correspond to multiple data accountability levels, such as a region K corresponding to a data accountability level $d_1$ with respect to a region 1, the region K corresponding to a data accountability level $d_2$ with respect to a region 2, ..., etc. The degree of negative correlation S may be determined based on the following formula (3):

$$S = 0.5 + (d_1 + d_2 + ... + d_N)/N \qquad (3)$$

Where $d_1, d_2, ..., $ and $d_N$ denote the data accountability levels of the gas regulatory region with respect to regions 1, 2, ..., and N, respectively.

In some embodiments of the present disclosure, by combining the data accountability levels of an associated gas regulatory region, and by determining the amount of data of the additional regulatory information based on the amount of data of the historical redundant data and the historical contradictory data, the amount of data of the additional regulatory information can be set more reasonably, ensuring that the submitted target gas regulatory information meets quality requirements of the government regulatory management platform 130 as much as possible.

Operation 2233, issuing a control command based on the additional regulatory information to adjust data collection frequencies of data monitoring devices corresponding to the different gas regulatory regions.

A data collection frequency of a data monitoring device refers to a frequency at which the data monitoring device collects gas regulatory information.

In some embodiments, the gas company management platform 151 may adjust the data collection frequency of the corresponding data monitoring device based on the data items (types) included in the additional regulatory information. For example, if the amount of data of a data item in the additional regulatory information is excessive, the f data collection frequency of the gas monitoring device corresponding to the data item may be reduced accordingly. As another example, for a potentially problem data item (e.g., a gas pressure fluctuation in a pipeline, etc.) in the additional regulatory information, the data collection frequency of the gas monitoring device on the pipeline may be increased. By way of example, if the additional regulatory information includes gas pressure fluctuation data for a set of gas branch transmission pipelines in a gas regulatory region, the gas company management platform 151 may correspondingly increase the data collection frequencies of the gas monitoring devices on the set of gas branch transmission pipelines accordingly.

In some embodiments of the present disclosure, the historical problem data corresponding to different gas regulatory regions are different, and by determining the weighted frequency values based on the historical problem data, different additional regulatory information corresponding to different gas regulatory regions can be determined in a more reasonable manner, thereby ensuring that the target gas regulatory information submitted by the different gas regulatory regions can fully meet data requirements of government management platforms. Furthermore, adjusting the data collection frequencies of corresponding data monitoring devices based on the additional regulatory information of the different gas regulatory regions allows for targeted adjustments to the data collection process according to specific needs.

In some embodiments, the gas company management platform 151 may establish a regulatory graph based on different gas regulatory regions and different target gas regulatory information corresponding to the different gas regulatory regions. Nodes of the regulatory graph include the gas regulatory regions and edges of the regulatory graph connect the gas regulatory regions where data cross-management exists. Based on the regulatory graph, updated data accountability levels corresponding to the different gas regulatory regions may be determined using a regulatory model, which may be a machine learning model.

A regulatory graph refers to a graph established based on different gas regulatory regions. The regulatory graph includes edges and nodes.

The nodes of the regulatory graph include the gas regulatory regions.

In some embodiments, a node attribute of the nodes of the regulatory graph may include historical redundant data, historical contradictory data, and a feedback result from the government regulatory management platform 130. In some embodiments, the node attribute of the nodes of the regulatory graph further include the target gas regulatory information. More descriptions regarding the redundant data, the contradictory data, the feedback result, and the target gas regulatory information may be found in FIG. 2-FIG. 4 and the related descriptions thereof.

The edges of the regulatory graph connect the gas regulatory regions where data cross-management exists, i.e., different regulatory regions that may have redundant date and contradictory data with each other are connected by the edges. In some embodiments, different gas regulatory regions that are adjacent to each other or with hierarchical jurisdictional relationships may also be connected by the edges.

In some embodiments, an edge attribute of an edge of the regulatory graph may include historical data accountability levels and current data accountability levels of the gas regulatory regions corresponding to each of two nodes connected by the edge. A type of the historical data accountability level may include a variable type and a fixed type. The variable type means that the value of the historical data accountability level may change, and the fixed type means that the value of the historical data accountability level remains constant. Categorizing the historical data responsibility levels of different nodes into the fixed type and the variable type can better reflect actual circumstances and ensure the data quality of the target gas regulatory information.

In some embodiments, when the type of the historical data accountability level is the fixed type, the updated data accountability level is the historical data accountability level. In some embodiments, the historical data accountability level may be determined based on a weighted frequent value of the gas regulatory region corresponding to the node in the manner illustrated in the relevant description of FIG. 3. In some embodiments, when the historical data accountability level is the variable type, the data accountability level is updated in the manner illustrated in the relevant description of FIG. 2. In some embodiments, the data accountability levels may be set as the variable type and updated. For a gas regulatory region where the actual situation is more complex (e.g., where the amount of data is extremely large), the type of the data accountability level may be set as the fixed type, i.e., the data accountability level remains unchanged after it is determined.

In some embodiments, the gas company management platform 151 may determine the fixed type of the historical data accountability level based on a count of occurrences of the historical problem data over a preset time period. The higher the count of occurrences, the lower the data accountability level of the historical problem data. In some embodiments, the gas company management platform 151 may obtain a weighted count of occurrences of the historical problem data based on the count of occurrences of the historical problem data over a preset time period. A weight may be related to a time interval between a time when the historical problem data occurred and a current time. If the weighted count of occurrences of the historical problem data reaches a preset threshold (e.g., reaching 5 occurrences), the historical data accountability levels is then fixed at a relatively low value (e.g., 10%). By way of example, if the time intervals between the time when the historical problem data occurred and the current time is 6 days, 5 days, and 1 day, respectively, then the weighted count of occurrences of the historical problem data is $\exp(-6)+\exp(-5)+\exp(-1)$.

In some embodiments, the gas company management platform 151 may determine the data accountability level through the regulatory model.

FIG. 5 is a schematic diagram of an exemplary regulatory model according to some embodiments of the present disclosure.

In some embodiments, the regulatory model is a machine learning model, e.g., a graph neural networks (GNN) model, etc.

In some embodiments, as shown in FIG. 5, an input of the regulatory model 520 includes a plurality of candidate regulatory graphs 510, and an output of the regulatory model 520 includes a predicted data quality 530. The predicted data quality 530 refers to the data quality corresponding to each of the plurality of candidate regulatory graphs 510, and a larger value of the predicted data quality 530 indicates better data quality.

The plurality of candidate regulatory graphs may be determined by a regulatory graph. In some embodiments, the plurality of candidate regulatory graphs may be obtained by adjusting a current data accountability level in an edge attribute of an edge of the regulatory graph through a predetermined rule. For example, the current data accountability level may be adjusted in a step of +2% based on the predetermined regulatory graph to obtain the plurality of candidate regulatory graphs.

In some embodiments, the regulatory model may be obtained by model training based on a sample regulatory graph. The training sample may include a sample regulatory graph established based on actual data. In some embodiments, the training sample may include a positive sample and a negative sample. The positive sample and the negative sample may be determined based on a ratio of a count of occurrences of problems such as data submission conflicts and submission errors in multiple sets of data submitted by a gas regulatory region to a total count of data sets submitted by the gas regulatory region. For example, a sample with a ratio between 0 and 0.5 (including 0.5) is designated as the positive sample, and a sample with a ratio between 0.5 and 1 is designated as the negative sample.

In some embodiments, the gas company management platform 151 may obtain the problems such as data submission conflicts and submission errors based on a feedback result of the government regulatory management platform 130.

In some embodiments, a difference in a count of positive samples and a count of negative samples may be less than a first preset threshold, thereby ensuring accuracy and efficiency of the model training for the regulatory model. The first preset threshold may be determined based on a total count of training samples, and the larger the total count of the training samples, the higher the first preset threshold.

A label for the model training may be a sequence of updated data accountability levels, which may be annotated manually. Gas regulatory information may be adjusted based on the data accountability levels corresponding to historical data of the sample regulatory graphs before being submitted to the government regulatory management platform 130. Then, the label may be determined based on the feedback result of the government regulatory management platform 130. If the feedback result has no negative outcomes, i.e., the categorization of the historical data accountability levels is reasonable, then the label is set as 1. The feedback result has negative outcomes, i.e., the categorization of the data accountability levels is unreasonable, resulting in defects or errors in the submitted gas regulatory information, then the label is set as 0.

During a running time of the updated data accountability levels system malfunctions caused by contradictory data collection and excessive collection of inaccurate data, which may lead to system misjudgments, may be determined as negative outcomes.

In some embodiments, the gas company management platform 151 may input a plurality of training samples with labels into an initial regulatory model, construct a loss function based on the labels and a result of the initial regulatory model, and iteratively update a parameter of the initial regulatory model based on the loss function. The model training may be determined to be completed when the loss function of the initial regulatory model satisfies a preset condition, and a trained regulatory model may be obtained. The preset conditions may be that the loss function converges, a count of iterations reaches a threshold, etc.

In some embodiments, the gas company management platform 151 may determine the candidate regulatory graph corresponding to the predicted data quality with the largest value as the final executed regulatory graph and adjusted current data accountability levels of the final executed regulatory graph as the updated data accountability levels.

In some embodiments of the present disclosure, the gas company management platform 151 establishes the regulatory graph based on the data from different gas regulatory regions, thereby clearly presenting a correlation between the different gas regulatory regions in terms of gas data. By processing the regulatory graph using the trained regulatory model, the updated data accountability levels of the different gas regulatory regions can be quickly obtained. Consequently, the redundant data and the contradictory data in the gas regulatory information submitted by the different gas regulatory regions can be reasonably assigned with responsibilities and eliminated, thereby ensuring the quality of the gas data.

Having thus described the basic concepts, it may be rather apparent to those skilled in the art after reading this detailed disclosure that the foregoing detailed disclosure is intended to be presented by way of example only and is not limiting. Various alterations, improvements, and modifications may occur and are intended to those skilled in the art, though not expressly stated herein. These alterations, improvements, and modifications are intended to be suggested by this disclosure, and are within the spirit and scope of the exemplary embodiments of this disclosure.

Moreover, certain terminology has been used to describe embodiments of the present disclosure. For example, the terms "one embodiment," "an embodiment," and/or "some embodiments" mean that a particular feature, structure, or characteristic described in connection with the embodiment is included in at least one embodiment of the present disclosure. Therefore, it is emphasized and should be appreciated that two or more references to "an embodiment" or "one embodiment" or "an alternative embodiment" in various portions of this disclosure are not necessarily all referring to the same embodiment. Furthermore, the particular features, structures, or characteristics may be combined as suitable in one or more embodiments of the present disclosure.

Furthermore, the recited order of processing elements or sequences, or the use of numbers, letters, or other designations therefore, is not intended to limit the claimed processes and methods to any order except as may be specified in the claims. Although the above disclosure discusses through various examples what is currently considered to be a variety of useful embodiments of the disclosure, it is to be understood that such detail is solely for that purpose, and that the appended claims are not limited to the disclosed embodiments, but, on the contrary, are intended to cover modifications and equivalent arrangements that are within the spirit and scope of the disclosed embodiments. For example, although the implementation of various components described above may be embodied in a hardware device, it may also be implemented as a software only solution, e.g., an installation on an existing server or mobile device.

Similarly, it should be appreciated that in the foregoing description of embodiments of the present disclosure, various features are sometimes grouped together in a single embodiment, figure, or description thereof for the purpose of streamlining the disclosure aiding in the understanding of one or more of the various inventive embodiments. This method of disclosure, however, is not to be interpreted as reflecting an intention that the claimed subject matter requires more features than are expressly recited in each claim. Rather, inventive embodiments lie in less than all features of a single foregoing disclosed embodiment.

In some embodiments, the numbers expressing quantities or properties used to describe and claim certain embodiments of the application are to be understood as being modified in some instances by the term "about," "approximate," or "substantially." For example, "about," "approximate," or "substantially" may indicate ±20% variation of the value it describes, unless otherwise stated. Accordingly, in some embodiments, the numerical parameters set forth in the written description and attached claims are approximations that may vary depending upon the desired properties sought to be obtained by a particular embodiment. In some embodiments, the numerical parameters should be construed in light of the number of reported significant digits and by applying ordinary rounding techniques. Notwithstanding that the numerical ranges and parameters setting forth the broad scope of some embodiments of the application are approximations, the numerical values set forth in the specific examples are reported as precisely as practicable.

Each of the patents, patent applications, publications of patent applications, and other material, such as articles, books, specifications, publications, documents, things, and/or the like, referenced herein is hereby incorporated herein by this reference in its entirety for all purposes, excepting any prosecution file history associated with same, any of same that is inconsistent with or in conflict with the present document, or any of same that may have a limiting effect as to the broadest scope of the claims now or later associated with the present document. By way of example, should there be any inconsistency or conflict between the description, definition, and/or the use of a term associated with any of the incorporated material and that associated with the present document, the description, definition, and/or the use of the term in the present document shall prevail.

In closing, it is to be understood that the embodiments of the application disclosed herein are illustrative of the principles of the embodiments of the application. Other modifications that may be employed may be within the scope of the application. Thus, by way of example, but not of limitation, alternative configurations of the embodiments of the application may be utilized in accordance with the teachings herein. Accordingly, embodiments of the present application are not limited to that precisely as shown and described.

What is claimed is:

1. A method for processing smart gas regulatory information based on a regulatory Internet of Things (IoT), the method being executed by a gas company management platform of a system for processing the smart gas regulatory information, the system comprising a public user platform, a government regulatory service platform, a government regulatory management platform, a government regulatory sensing network platform, a government regulatory object platform, a gas company sensing network platform, a gas user object platform, and a gas device object platform, wherein the public user platform is configured as a terminal device, the government regulatory object platform includes a gas company management platform, the gas user object platform interacts with the gas company management platform via the gas company sensing network platform, the gas company management platform is configured on a gas company management server, the gas device object platform is configured in a gas pipeline facility and a gas pipeline ancillary facility; the method comprising:

obtaining gas regulatory information of a plurality of gas regulatory regions based on the gas company sensing network platform of the system for processing the smart gas regulatory information, wherein the gas company sensing network platform includes a plurality of sets of communication sub-devices configured in different gas regulatory regions of the plurality of gas regulatory regions, and communication priorities of the plurality of sets of communication sub-devices in the different gas regulatory regions are different; and the gas regulatory information includes gas business data and gas safety data, the gas business data includes gas engineering construction data, the gas safety data includes gas pipeline network maintenance data;

determining target gas regulatory information from the gas regulatory information based on a target regulatory characteristic;

updating data accountability levels of the different gas regulatory regions based on the target gas regulatory information; wherein the data accountability levels are used to reflect division of accountability regarding data quality in the different gas regulatory regions, and the updating data accountability levels of the different gas regulatory regions includes:

establishing a regulatory graph based on the different gas regulatory regions and different target gas regulatory information corresponding to the different gas regulatory regions, wherein nodes of the regulatory graph include the different gas regulatory regions and edges of the regulatory graph connect gas regulatory regions involved in data cross-management; and determining, based on the regulatory graph, updated data accountability levels of the different gas regulatory regions through a regulatory model, the regulatory model being a neural network model;

wherein the regulatory graph refers to a graph established based on the different gas regulatory regions; the regulatory graph includes edges and nodes;

a node attribute of the nodes of the regulatory graph includes historical redundant data, historical contradictory data, and the target gas regulatory information;

an edge attribute of an edge of the regulatory graph includes historical data accountability levels and current data accountability levels of the gas regulatory regions corresponding to each of two nodes connected by the edge;

wherein the regulatory model is obtained through a training process including:

inputting, by the gas company management platform, a plurality of training samples with labels into an initial regulatory model; wherein the training samples include a sample regulatory graph established based on actual data, the labels for the model training is a sequence of updated data accountability levels;

constructing a loss function based on the labels and a result of the initial regulatory model;

iteratively updating parameters of the initial regulatory model based on the loss function;

completing training of the initial joint regulatory model until the loss function satisfies a preset training condition, and obtaining a joint regulatory model;

wherein the preset training condition includes that the loss function converges or a count of iterations reaches a first threshold;

determining redundant data and contradictory data based on the target gas regulatory information and the data accountability levels;

obtaining processed target gas regulatory information based on the redundant data and the contradictory data, and transmitting the processed target gas regulatory information to the government regulatory management platform of the system for processing the smart gas regulatory information via the government regulatory sensing network platform of the system for processing the smart gas regulatory information, so as to enable the government regulatory management platform to establish a gas regulatory database based on the processed target gas regulatory information and further provide a gas regulatory query service to a user through the public user platform of the system for processing the smart gas regulatory information; and adjusting the communication priorities of the plurality of sets of communication sub-devices based on the data accountability levels.

2. The method according to claim 1, wherein the determining target gas regulatory information from the gas regulatory information based on a target regulatory characteristic includes:

determining necessary regulatory information based on the target regulatory characteristic, wherein the necessary regulatory information includes data on severe gas accidents and complaints from important gas customers;

automatically performing a dynamic adjustment on the target regulatory characteristic based on a feedback result of the government regulatory management platform of the system for processing the smart gas regulatory information and sending an adjustment result to the government regulatory management platform for record;

obtaining historical regulatory data of the different gas regulatory regions and determining additional regulatory information from the gas regulatory information; and determining the target gas regulatory information based on the necessary regulatory information and the additional regulatory information.

3. The method according to claim 2, wherein the dynamic adjustment further includes: adjusting the necessary regulatory information based on the feedback result, and historical problem data and an average data accountability level of the different gas regulatory regions.

4. The method according to claim 2, wherein the determining additional regulatory information from the gas regulatory information includes:

determining weighted frequency values of historical problem data corresponding to the different gas regulatory regions based on the historical problem data of the different gas regulatory regions, the historical problem data including historical gas fault data, historical communication transmission problem data, and historical gas processing problem data;

determining the additional regulatory information corresponding to the different gas regulatory regions respectively based on the historical problem data, the weighted frequency values, historical redundant data, and historical contradictory data; and issuing a control command based on the additional regulatory information to adjust data collection frequencies of data monitoring devices corresponding to the different gas regulatory regions.

5. The method according to claim 2, wherein an amount of data of the additional regulatory information is negatively correlated with an amount of data of the historical redundant data and the historical contradictory data.

6. The method according to claim 5, wherein a degree of the negative correlation is related to a data accountability level of another gas regulatory region corresponding to the historical redundant data and the historical contradictory data.

7. The method according to claim 1, wherein the node attribute of the nodes of the regulatory graph includes a feedback result from the government regulatory management platform.

8. The method according to claim 1, wherein a type of the historical data accountability level includes a variable type and a fixed type, the variable type refers to a value of the historical data accountability level changes, and the fixed type refers to a value of the historical data accountability level remains constant.

9. A system for processing smart gas regulatory information based on a regulatory Internet of Things (IoT), comprising a public user platform, a government regulatory service platform, a government regulatory management platform, a government regulatory sensing network platform, a government regulatory object platform, a gas company sensing network platform, a gas user object platform, and a gas device object platform, wherein the public user platform is configured as a terminal device, the government regulatory service platform includes a citizen cloud service sub-platform and a government safety management service sub-platform, the government regulatory management platform includes a government gas business management sub-platform and a government safety management sub-platform, the government regulatory sensing network platform includes a government gas regulatory authority sensing network sub-platform and a government safety management department sensing network sub-platform, the government regulatory object platform includes a gas company management platform, the gas user object platform interacts with the gas company management platform via the gas company sensing network platform, the gas company management platform is configured on a gas company management server, the gas device object platform is configured in a gas pipeline facility and a gas pipeline ancillary facility; the gas company management platform is configured to:

obtain gas regulatory information of a plurality of gas regulatory regions based on the gas company sensing network platform of the system for processing the smart gas regulatory information, wherein the gas regulatory information is obtained and stored based on the gas device object platform and the gas user object platform of the plurality of gas regulatory regions, the gas company sensing network platform includes a plurality of sets of communication sub-devices configured in different gas regulatory regions of the plurality of gas regulatory regions, and communication priorities of the plurality of sets of communication sub-devices in the different gas regulatory regions are different; and the gas regulatory information includes gas business data and gas safety data, the gas business data includes gas engineering construction data, the gas safety data includes gas pipeline network maintenance data;

determine a target regulatory characteristic based on the government regulatory management platform and determine target gas regulatory information from the gas regulatory information based on the target regulatory characteristic;

update data accountability levels of the different gas regulatory regions based on the target gas regulatory information; wherein the data accountability levels are used to reflect division of accountability regarding data quality in the different gas regulatory regions, and the updating data accountability levels of the different gas regulatory regions includes:

establishing a regulatory graph based on the different gas regulatory regions and different target gas regulatory information corresponding to the different gas regulatory regions, wherein nodes of the regulatory graph include the different gas regulatory regions and edges of the regulatory graph connect gas regulatory regions involved in data cross-management; and determining, based on the regulatory graph, updated data accountability levels of the different gas regulatory regions through a regulatory model, the regulatory model being a neural network model;

wherein the regulatory graph refers to a graph established based on the different gas regulatory regions; the regulatory graph includes edges and nodes;

a node attribute of the nodes of the regulatory graph includes historical redundant data, historical contradictory data, and the target gas regulatory information;

an edge attribute of an edge of the regulatory graph includes historical data accountability levels and current data accountability levels of the gas regulatory regions corresponding to each of two nodes connected by the edge;

wherein the regulatory model is obtained through a training process including:

inputting, by the gas company management platform, a plurality of training samples with labels into an initial regulatory model; wherein the training samples include a sample regulatory graph established based on actual data, the labels for the model training is a sequence of updated data accountability levels;

constructing a loss function based on the labels and a result of the initial regulatory model;

iteratively updating parameters of the initial regulatory model based on the loss function;

completing training of the initial joint regulatory model until the loss function satisfies a preset training condition, and obtaining a joint regulatory model; wherein the preset training condition includes that the loss function converges or a count of iterations reaches a first threshold;

determining redundant data and contradictory data based on the target gas regulatory information and the data accountability levels;

obtaining processed target gas regulatory information based on the redundant data and the contradictory data, and transmit the processed target gas regulatory information to the government regulatory management platform via the government regulatory sensing network platform;

adjusting the communication priorities of the plurality of sets of communication sub-devices based on the data accountability levels;

the government regulatory management platform is configured to establish a gas regulatory database based on the processed target gas regulatory information; and the public user platform is configured to provide a gas regulatory query service to a user.

10. The system according to claim 9, wherein to determine the target gas regulatory information from the gas regulatory information based on the target regulatory characteristic, the gas company management platform is further configured to:

determine necessary regulatory information based on the target regulatory characteristic;

automatically perform a dynamic adjustment on the target regulatory characteristic based on a feedback result of the government regulatory management platform of the system for processing the smart gas regulatory information and send an adjustment result to the government regulatory management platform for record;

obtain historical regulatory data of the different gas regulatory regions and determine additional regulatory information from the gas regulatory information; and determine the target gas regulatory information based on the necessary regulatory information and the additional regulatory information.

11. The system according to claim 10, wherein to determine the additional regulatory information from the gas regulatory information, the gas company management platform is further configured to:

determine weighted frequency values of historical problem data corresponding to the different gas regulatory regions based on the historical problem data of the different gas regulatory regions, the historical problem data including historical gas fault data, historical communication transmission problem data, and historical gas processing problem data;

determine additional regulatory information corresponding to the different gas regulatory regions respectively based on the historical problem data, the weighted frequency values, historical redundant data, and historical contradictory data; and issue a control command based on the additional regulatory information to adjust data collection frequencies of data monitoring devices corresponding to the different gas regulatory regions.

12. The system according to claim 10, wherein to perform the dynamic adjustment on the target regulatory characteristic, the gas company management platform is further configured to adjust the necessary regulatory information based on the feedback result, and historical problem data and an average data accountability level of the different gas regulatory regions.

* * * * *